United States Patent [19]
Brocke et al.

[11] Patent Number: 5,466,508
[45] Date of Patent: Nov. 14, 1995

[54] SEAL FOR A RIGID PANEL FOR A VEHICLE ROOF OPENING

[75] Inventors: Rolf Brocke, Wangen; Klaus Glagow, Wasserburg, both of Germany

[73] Assignee: Metzeler Automotive Profiles, GmbH, Lindeu Bodensee, Germany

[21] Appl. No.: 213,114

[22] Filed: Mar. 14, 1994

[30] Foreign Application Priority Data

Mar. 15, 1993 [DE] Germany ............... 43 08 214.9

[51] Int. Cl.$^6$ ............... B60J 10/12; E06B 7/23; E06B 3/62
[52] U.S. Cl. ............... 428/122; 428/358; 49/490.1; 49/493.1; 49/498.1; 296/93; 296/216
[58] Field of Search ............... 156/108; 296/84.1, 296/93, 96.21, 201, 216, 218; 428/192, 122, 358; 52/208; 49/490.1, 493.1, 498.1, 475.1

[56] References Cited

U.S. PATENT DOCUMENTS

| | | | |
|---|---|---|---|
| 3,705,470 | 12/1972 | Kent | 296/93 X |
| 4,509,791 | 4/1985 | Bienert et al. | 296/216 |
| 4,738,482 | 4/1988 | Böhm et al. | 296/216 |
| 4,853,520 | 8/1989 | Hochart et al. | 296/84.1 X |
| 4,891,913 | 1/1990 | Shimura et al. | 296/216 X |
| 4,925,237 | 5/1990 | Böhn et al. | 296/216 |
| 5,107,646 | 4/1992 | Tamura | 296/84.1 X |
| 5,139,305 | 8/1992 | Kranz et al. | 296/201 X |
| 5,170,587 | 12/1992 | Nakatani et al. | 296/216 X |
| 5,234,250 | 8/1993 | Hattass et al. | 296/216 |

Primary Examiner—Michael W. Ball
Assistant Examiner—Francis J. Lorin
Attorney, Agent, or Firm—Cumpston & Shaw

[57] ABSTRACT

In order to facilitate manufacture and assembly of a rigid cover for a vehicle roof with a peripheral seal opposite of the roof opening there is provided according to the invention that the gap seal (3) is manufactured from an elastomer and in the shape of a coextruded profile with a profile area (10) comprising the glass panel (2) and the rim (16) of the base frame (15), and has a U-shaped reinforcement (20) on the inside and a profile area on the inside in the shape of a hollow chamber seal (22) made of sponge rubber, which is delivered as one module with the four corners (30–33) flexed into a frame (6) still open on the posterior lateral side; during assembly this module will be laterally attached to the rim of the other module consisting of glass panel (2) and base frame (15), and the open frame ends (7, 8) are glued and screwed together (FIG. 2).

10 Claims, 2 Drawing Sheets

SEAL FOR A RIGID PANEL FOR A VEHICLE ROOF OPENING

BACKGROUND OF THE INVENTION

The invention relates to a process for the manufacture of a rigid cover for a vehicle roof with a peripheral seal along the roof opening, comprising a glass panel and glued to a base frame, underlain in the rim area and protruding over the sides, as well as a gap seal, which is connected to the protruding rim of the base frame.

A cover of this kind and a corresponding manufacturing process is known from DE-OS 36 39 894. There this cover comprises a multitude of individual components, which have to be joined together in a complex manner during the final assembly. Here there is laid between the glass panel and the actual seal a peripheral, T-shaped aluminum profile, which has to be secured against the protruding rim of the base frame. Altogether, several phases of operation and auxiliary devices are required to create a finished cover.

By contrast, the underlying objective of the present invention is to specify a process for the manufacture of such a cover, according to which such a cover can be manufactured much more easily and particularly out of fewer individual components.

SUMMARY OF THE INVENTION

In order to achieve this objective in compliance with invention specifications the gap seal is manufactured from elastomer in the shape of a coextruded profile with a profile area comprising the glass panel and the rim of the base frame, and has a U-shaped reinforcement on the inside, and an exterior profile area in the shape of a hollow chamber seal made of sponge rubber, which is delivered as one module with the four corners flexed into a frame still open on the posterior lateral side; during assembly this module will be laterally attached to the rim of the other module consisting of glass panel and base frame, and the open frame ends are glued and screwed together.

Thus there are only two pre-fabricated modules in this assembly, namely the gap seal, which is delivered as an open frame, on the one hand and the glass panel with the peripheral base frame on the other hand, which two modules can then be joined together easily.

The flexing of the open frame is appropriately achieved through a Roll-Forming-Procedure.

Furthermore, it is expedient to manufacture the elastomer area of the gap seal from EPDM with a shore-A hardness of approximately 70.

With a cover manufactured according to this process a further development of the invention is provided in that the gap seal consists of two profile sections A and B, wherein section A extends beyond the front edge of the cover and comprises a sealing lip, extending laterally from the elastomer part over the sponge rubber profile area, and another sealing lip extending from the sponge rubber profile area diagonally down and to the outside, and wherein section B, with a cut-off sealing lip in the upper area, extends across the remaining area of the cover.

Here the elastomer area of the profile may feature three ridges extending laterally downward, the upper two of which cover the edge of the glass panel, and the lower two of which cover the edge of the base frame, whereby a reinforcement on the inside extends U-shaped from the upper ridge across the vertical main area of the profile into the lower ridge, thereby covering the edge of the glass panel and the base frame.

It is expedient here that the reinforcement consist of an aluminum belt, or a punch strip with recesses on the inside.

In addition there might be placed between upper and middle ridge a sealing lip, which seals against the peripheral edge of the glass panel.

It is also possible, however, that the middle ridge itself is designed as a sealing lip towards the edge of the glass panel.

In order to secure the profile, the rim of the base frame can be attached between the two lower ridges of the elastomer profile area by means of a heat-activated adhesive.

Here the heat-activated adhesive can be embedded in a lateral recess of the middle ridge.

As a special protection against a potential slitting of the rim seal it is expedient that the reinforcement is designed in two layers in the upper area in such a manner that the upper reinforcement extend in an approximately Z-shaped fold from the profile ridge, which extends over the edge of the glass panel, into the profile main area, and the lower, U-shaped reinforcement extend from below the fold of the upper reinforcement into the lower ridge of the profile.

BRIEF DESCRIPTION OF THE DRAWING

By means of a schematic diagram, the composition and manner of operation of embodiments of the invention are more clearly illustrated. Here is shown in.

DESCRIPTION OF THE PREFERRED EMBODIMENTS

Figure 1:
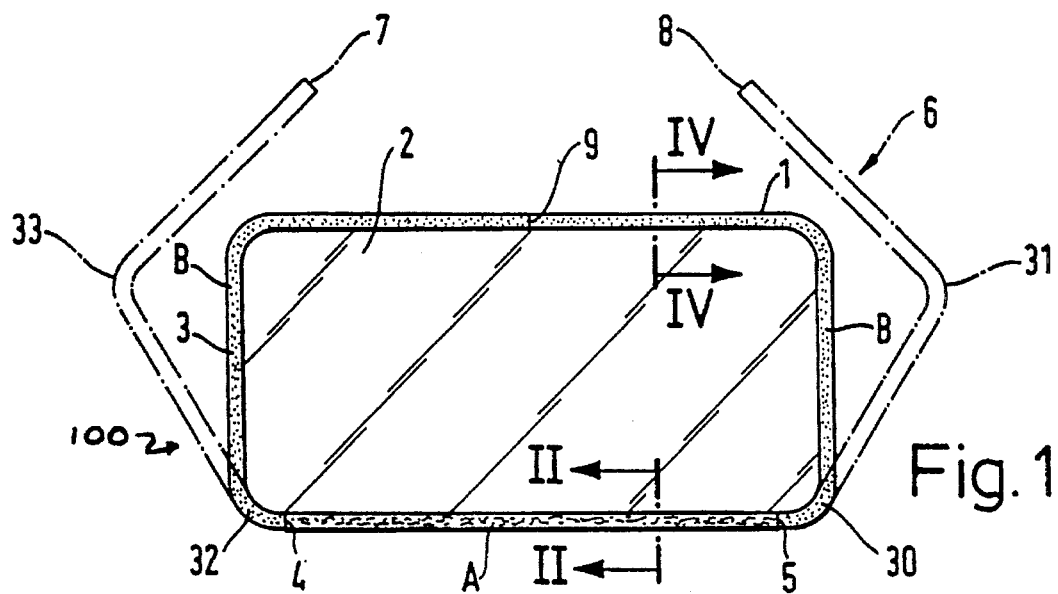
FIG. 1 a top plan view of the cover within the roof opening.

According to the top plan view of a vehicle roof with a rectangular roof opening 1 illustrated in FIG. 1, the cover designated generally 100 which for the main part consists of a glass panel 2, is enclosed by a gap seal towards the roof opening 1 on all sides. This gap seal can consist of two different profile sections here, namely the profile section A at the front edge of the cover, which can be opened, and the profile section B, which encloses the remaining areas of the cover 100. Here the profile section A features two joining points 4 and 5 toward the profile section B, at which points the two profile sections A and B are glued together.

Moreover, as is evident from the drawing, this profile is in the first instance manufactured as a frame 6, which is still open on the back side, but which is already flexed at the respective corners. After this open profile frame 6 has been slid onto the glass panel 2 or the underlying frame, respectively, the free ends 7 and 8 of this open frame 6 are joined and adhered or, if necessary, also screwed together at the joining point 9.

Figure 2:
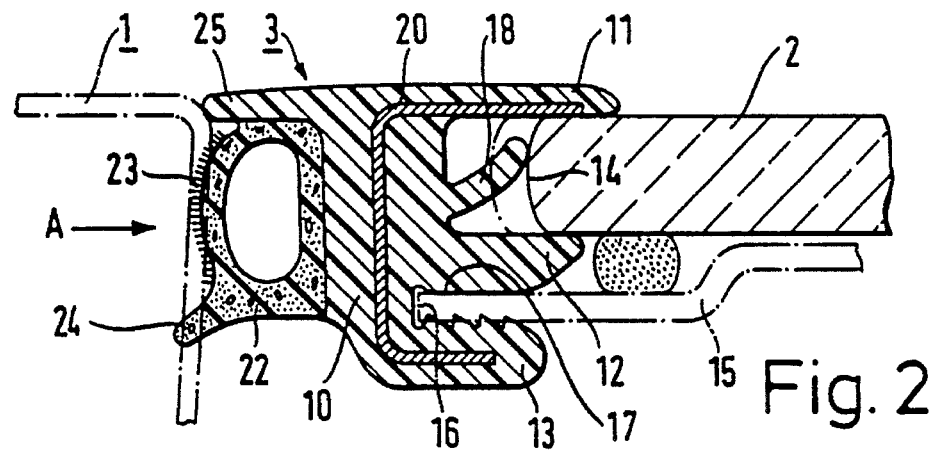
FIG. 2 a longitudinal section of the rim area of the cover at the front edge with a seal along section II—II of FIG. 1, FIG. 3 a top plan view of the section of the reinforcement, FIG. 4 a seal of the same kind as in FIG. 2 for the remaining peripheral areas of the cover corresponding to section IV—IV of FIG. 1, FIG. 5 a longitudinal section of a somewhat modified seal at the front edge of the cover, FIG. 6 a longitudinal section of the rim area of the cover at the front edge for a modified, burglary-proof seal and additional adhesive, FIG. 7 a seal of the same kind for the remaining, peripheral area of the cover, and FIG. 8 a longitudinal section of the seal area of a seal with special method for adhering.

FIG. 2 shows a longitudinal section of the rim area of the cover along section II—II of FIG. 1 together with the attached gap designated generally by seal 3. In the area of profile section A this gap seal 3 at first shows a basic profile area 10, which runs vertically and from which extend three ridges 11, 12, and 13 to the right, whereby the edge 14 of the glass panel 2 is secured between ridges 11 and 13, while base frame 15, which underlies the rim area of glass panel 2 is secured between the two lower ridges 12 and 13 with its exterior rim 16 in a corresponding groove 17. In addition this base profile 10 features a sealing lip 18 between the upper and lower ridge 11 and 12, respectively, whereby this sealing lip 18 seals against the glass panel 2 and thus compensates for the tolerances between the base profile 10 and the glass panel 2.

For this purpose, the base profile 10 is manufactured from an elastomer, for example in the shape of EPDM with a shore-A hardness of 70.

Figure 3:
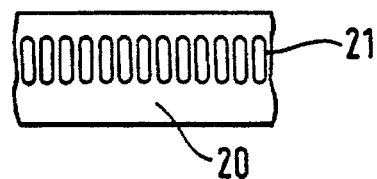

It is essential that the main profile 10 features a U-shaped reinforcement 20, like the punch strip with recesses on the inner side 21 shown in FIG. 3. This reinforcement extends from the edge of the glass panel 2 in the upper ridge 11 perpendicularly through the main profile 10 and ends in the lower ridge 13, where it encompasses the base frame 15.

Onto the outer side of the base profile 10 there is extruded a hollow chamber seal 22 made of sponge rubber preferably co-extruded with base profile 10, which features on its front edge a coating 23 and a diagonally downward protruding sealing lip 24 to seal against the roof opening 1. In addition, another sealing ridge 25 runs from the main profile 10 above this sponge rubber seal 22.

Figure 4:
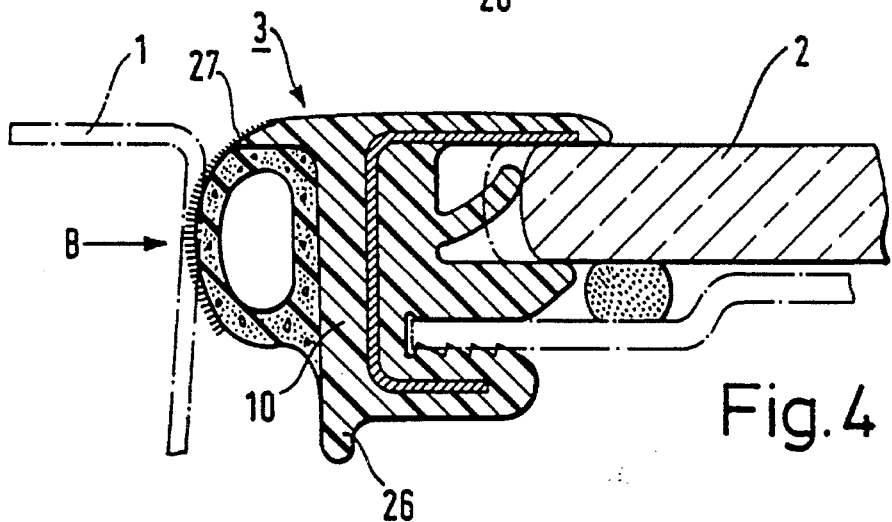

In FIG. 4 is shown a corresponding longitudinal section of the rim of the cover for the profile sections B. Here the gap seal 3 for the profile area B differs from the profile area A shown in FIG. 2 simply in that the main profile 10 features a ridge 26, extending downward and out, and that the sealing ridge 25 of FIG. 2 is omitted, so that the coating 27 now extends across the complete front edge up to the top side of the main profile 10.

After these two profile sections A and B have been completed, they are glued together at their joining edges 4 and 5 and then the corners 30, 31, 32, and 33 of the frame 6 are flexed according to the diagram in FIG. 1, and the frame is delivered as an open frame.

When manufacturing the two profile sections A and B it is also possible to manufacture these as a single-piece, continuous extrusion, whereby the protruding ridge of FIG. 2 in the transition areas from profile section A to profile section B is stripped off immediately after extrusion, so that the result is a contour like the one in FIG. 4.

Figure 5:
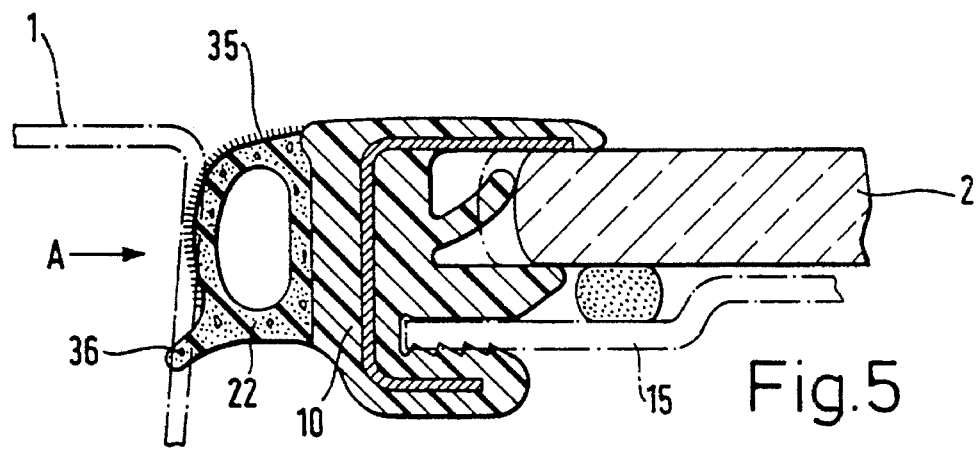

In FIG. 5 there is shown a further, very similar embodiment, in which the upper sealing ridge above the sponge rubber seal 22 in profile section A is already omitted, and the main profile 10 with its flank, which borders the sponge rubber profile 22, is finished practically even all the way to the top, so that the complete side of the main profile 10 from the sponge rubber seal 22 is designed with a corresponding coating 35, which extends all the way to the main profile 10.

With such a design it is easily possible to manufacture the whole profile frame 6 as one piece, where then only the lower lip 36 on the sponge rubber seal 22 has to be stripped off the profile areas B.

Figure 6:
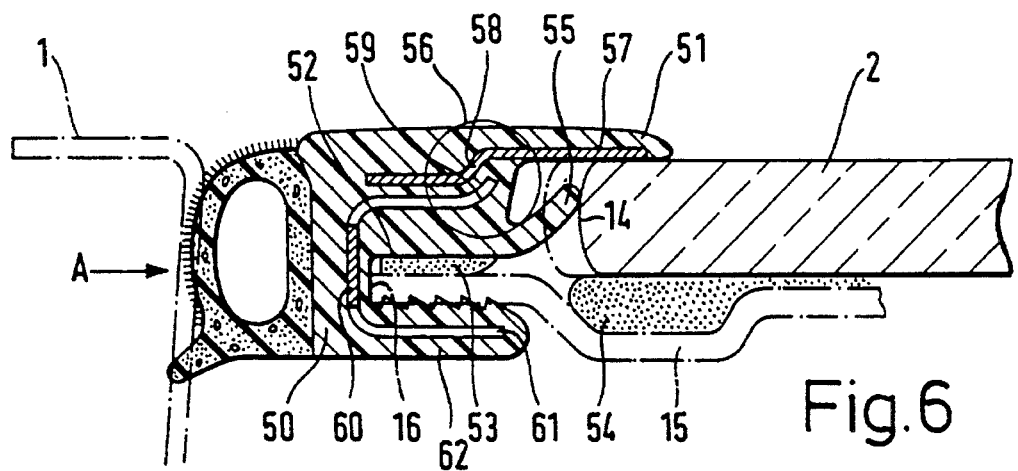
Figure 7:
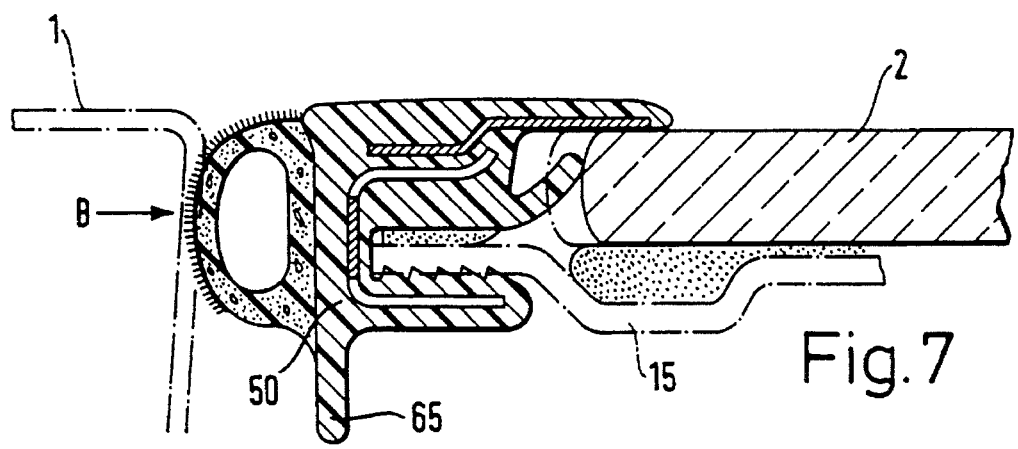

A special design is shown in FIG. 6 and 7. Here the main profile 50 features only one ridge 51, which extends to the glass panel, while the lower area is equipped with a gap 52, in which the edge 16 of the base frame 15 is secured by means of a layer of heat-activated adhesive 53. Here glass panel 2 and base frame 15 are joined together by means of an additional layer 54. A sealing lip extends from the middle area of the base profile to the edge 14 of the glass panel 2 in order to effect a compensation of tolerances.

Here the design of the reinforcement, which practically serves as a burglary-proof device to prevent cutting, is essential; the appropriate area is marked by the circle 56. In addition, an upper reinforcement 57 is incorporated, which extends in the ridge 51 from the top side of the glass panel 2 backwards, and shows an approximately Z-shaped fold 58 in the main profile area 50. Below this fold 58 lies the upper leg 59 of another U-shaped reinforcement 60, whose other leg 61 ends in the ridge 62 below the clamped-in edge 16 of the base frame 15.

Designing the reinforcements 57 and 60 in the upper area in such a double and folded manner it is practically impossible to cut this profile along the top side of the glass panel 2.

In FIG. 7 the same profile as in FIG. 6 is shown in the profile area B with a sealing ridge 65 extending downward from the main profile area 50.

Figure 8:
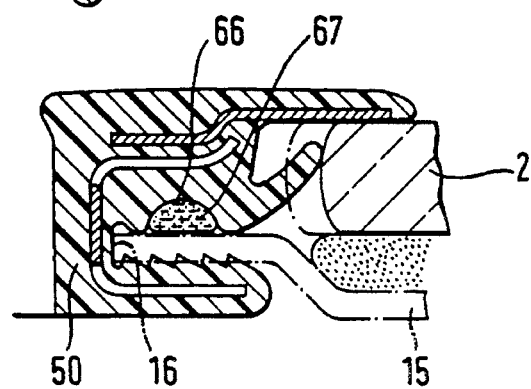

FIG. 8 shows another design of this seal, where the edge 16 of the base frame 15 is secured on the top side by the rubber of the main profile 50. Here only an indentation is designated, into which is introduced the heat-activated glue, in order to effect a strong adherence and securing of the base frame 15 in the profile 50.

Otherwise, this profile, corresponding to FIG. 6 through 8, is further processed and handled in the same manner as described in FIG. 1.

Altogether, this amounts to a gap seal which can be easily manufactured into a finished frame and can then be slid onto the module, which consists of glass panel 2 and the attached base frame 15, and anchored thereto.

We claim:

1. A seal for a glass panel for a roof opening of a vehicle roof, the glass panel having a base frame glued to and underlying the glass panel at a rim area and having an edge that projects beyond and parallel to the rim of the glass panel, comprising:

an elastomeric gap seal having an inner profile encompassing the rim of the glass panel and the edge of the base frame, and a hollow sponge rubber chamber seal;

the inner profile comprising first, second and third ridges extending laterally, the first and second ridges covering the rim of the glass panel and the second and third ridges forming a groove encompassing and securing the edge of the base frame;

a sealing lip disposed between the first and second ridges forming a seal against the rim of the glass panel;

a U-shaped reinforcement within the inner profile extending from the first ridge to the third ridge, encompassing the rim of the glass panel and the edge of the base frame;

the gap seal having first and second open ends adapted to be flexed between a spaced apart configuration for allowing the gap seal to be fitted to the glass panel and base frame and a close fitting configuration engaging the glass panel for allowing the ends to be connected together to secure the seal to the glass panel and base frame.

2. A seal according to claim 1, in which the inner profile comprises an ethylene propylene diene elastomer with a shore-A hardness of approximately 70.

3. A seal according to claim 1, comprising two profile sections, including a first section in which the inner profile extends beyond the front edge of the cover (2) and a first sealing lip (25), extending laterally from the inner profile over the hollow sponge rubber chamber seal (22) for contact with the vehicle roof, and the hollow sponge rubber chamber seal comprises a second sealing lip (24), extending from the sponge rubber chamber seal for contact with the vehicle roof and another section with a cut-off sealing lip in the upper area and a sealing lip (26) extending from the profile section along a direction generally perpendicular to the direction of the first and second sealing lips, and across the remaining area of the cover.

4. A seal according to claims 3, comprising a one piece continuously co-extruded seal in which the first sealing lip (25) of the first profile section, is present in the second profile section when the seal is formed and is removable immediately after extrusion from the lateral areas of the second profile section (B).

5. A seal according to claim 1, in which the reinforcement (20) comprises of a punch strip with recesses facing the glass panel.

6. A seal according to claim 1, in which the second ridge forms a seal with the glass edge.

7. A seal according to claim 6, comprising a heat activatable adhesive layer attaching the base frame (15) between the second and third ridges.

8. A seal according to claim 7, in which the heat activatable adhesive layer is disposed in a lateral recess (66) of the second ridge (55).

9. A seal according to claim 6, in which the U-shaped reinforcement comprises two layers, including an upper reinforcement layer (57) extending in an approximately Z-shaped fold (58) from the first ridge (51), which extends over the edge (14) of the glass panel (2), into the profile main area (50), and a lower, U-shaped reinforcement (60) extending from below the fold (58) of the upper reinforcement (57) into the third ridge (62).

10. A seal according to claim 1 in which the U-shaped reinforcement comprises two layers, including an upper reinforcement layer (57) extending in an approximately Z-shaped fold (58) from the first ridge (51), which extends over the edge (14) of the glass panel (2), into the profile main area (50), and a lower, U-shaped reinforcement (60) extending from below the fold (58) of the upper reinforcement (57) into the third ridge (62).

* * * * *